Dec. 19, 1950 F. F. BORKMANN 2,534,221
CONVEYER MECHANISM FOR TURNING ARTICLES
Filed May 15, 1947 2 Sheets-Sheet 1

INVENTOR
Frank F. Borkmann
BY Ivan D. Thornburgh
Charles H. Lane
ATTORNEYS

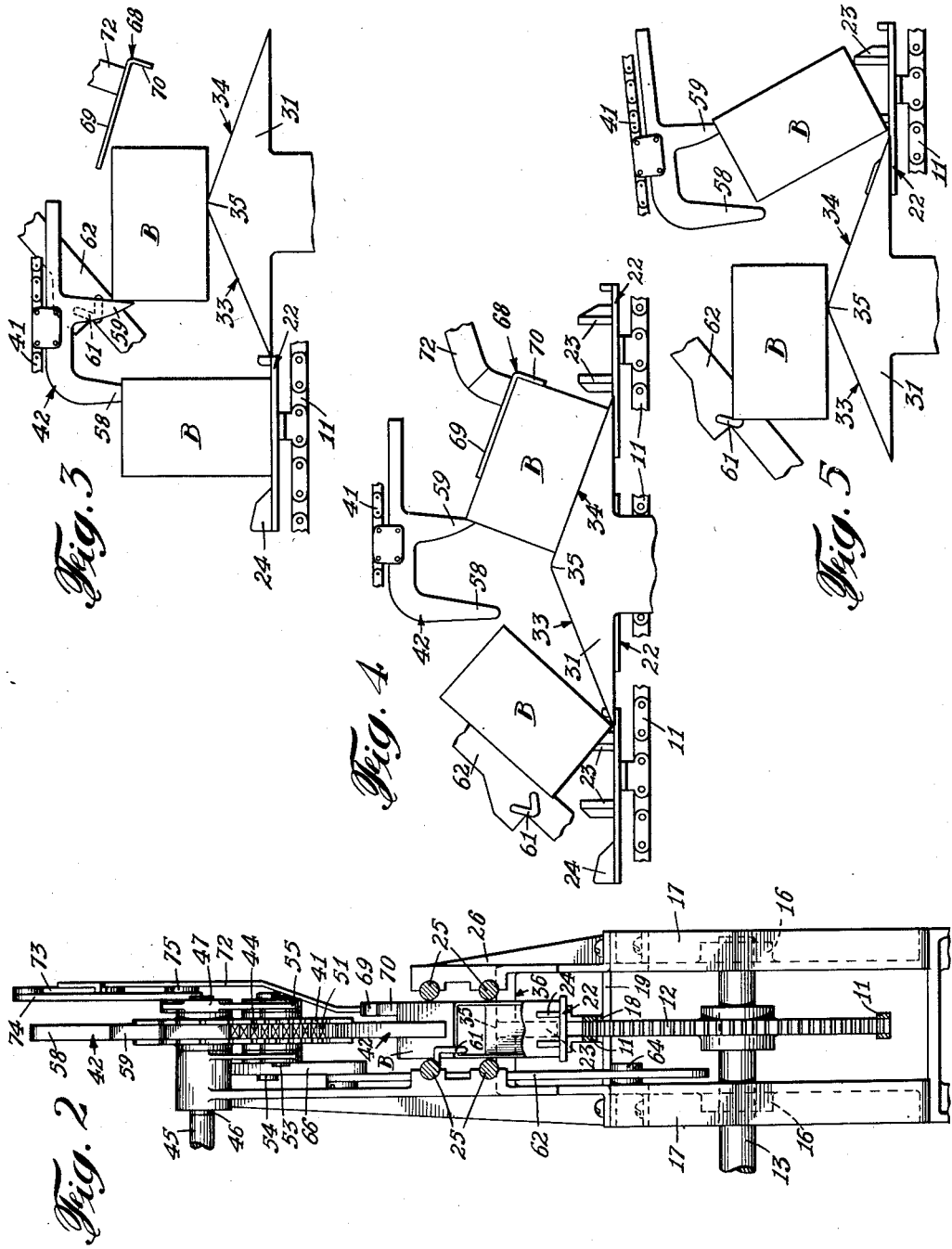

Patented Dec. 19, 1950

2,534,221

UNITED STATES PATENT OFFICE 2,534,221

CONVEYER MECHANISM FOR TURNING ARTICLES

Frank F. Borkmann, Union, N. J., assignor to American Can Company, New York, N. Y., a corporation of New Jersey Application May 15, 1947, Serial No. 748,212

12 Claims. (Cl. 198—33)

The present invention relates to a conveyor mechanism for tubular articles such as container or can bodies and has particular reference to devices for turning the bodies end over end through an angle of substantially 180 degrees as they move along a predetermined path of travel.

In the manufacture of certain kinds of containers such as fibre containers for frozen foods and other products, the bodies preferably are coated interiorly and exteriorly with paraffine or other suitable coating materials. Where the bodies are coated by immersion in a bath of the coating material, it is necessary for best results to drain them of excess coating substance. This is usually done by standing the bodies on end and permitting the excess coating material to flow down the sides of the bodies and drop off into the bath. However in such a method of draining the bodies an undue quantity of the coating material collects adjacent the bottom ends of the bodies and upon hardening produces a coating of greater thickness at these ends than at any other place on the bodies. Often a heavy band or ridge of the coating material is produced by this draining action. In either case a film of nonuniform thickness results and greatly hinders subsequent operations incidental to the forming of the body into a complete container.

The instant invention contemplates overcoming these difficulties by providing devices for turning the bodies during such a draining operation so that a film of the coating material may be uniformly distributed over all body surfaces, the devices being equally well adapted for any other operation which requires the bodies to be turned in an end over end fashion.

An object of the invention is the provision in a conveyor mechanism for carrying container bodies in a continuous procession, of turnover devices wherein each body may be turned end over end through an angle of substantially one hundred eighty degrees into an inverted position while they are moving along a predetermined path of travel.

Another object is the provision of such a turnover device wherein the turning of the bodies is effected gently and gradually without denting or crushing or otherwise damaging the bodies so as to facilitate high speed handling of the bodies.

Another object is the provision of such a turnover device wherein the bodies may be turned while maintaining them in timed order so that the relative position and spacing of the bodies while moving in a continuous procession may be preserved for subsequent operations which may be performed on the bodies.

Numerous other objects and advantages of the invention will be apparent as it is better understood from the following description, which, taken in connection with the accompanying drawings, discloses a preferred embodiment thereof.

Referring to the drawings:

Fig. 2 is an end elevation of the mechanism shown in Fig. 1 as viewed from the left in that figure; and Figs. 3, 4 and 5 are schematic views illustrating how the container bodies are turned over.

Figure 1:
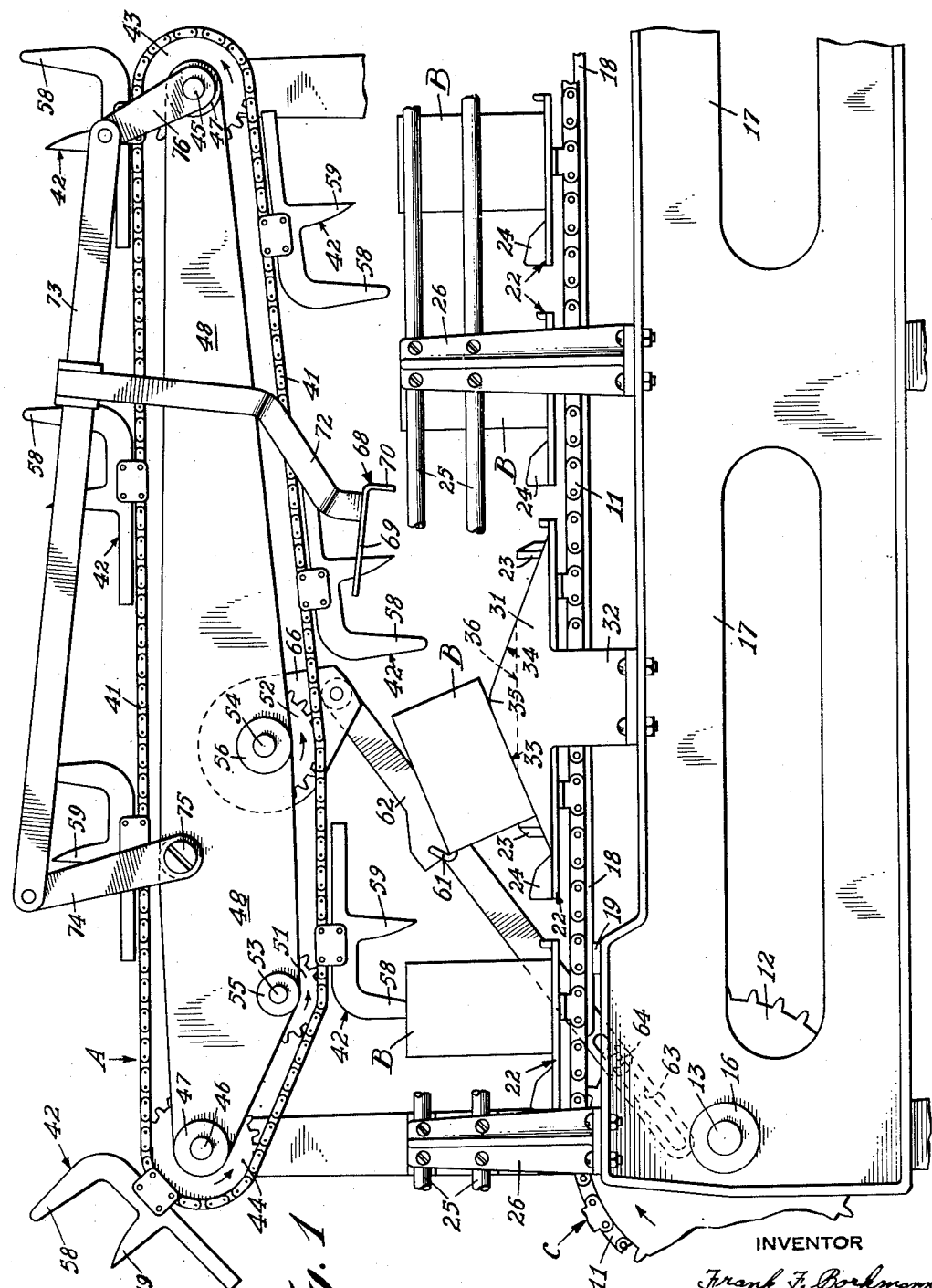
Figure 1 is a side elevation of a conveyor mechanism embodying the instant invention; with parts broken away.

As a preferred embodiment of the invention the drawings illustrate principal parts of a conveyor mechanism C and a cooperating turnover device A for turning vertically disposed container bodies B end over end through an angle of 180 degrees into an inverted position for a draining or other operation while maintaining them in timed relation as they move along a predetermined path of travel. The bodies being operated upon preferably are coated fibre bodies of rectangular cross-section of the type used for frozen foods and other products and have both ends open.

In the conveyor mechanism C, the bodies are carried along a straight line path of travel in a continuous procession in an upright position and in spaced and timed order by an endless chain, feeding conveyor 11 (Figs. 1 and 2) which operates over a sprocket 12 mounted on a horizontal shaft 13 journaled in bearings 16 formed in a frame 17 which may constitute the main frame of a more elaborate machine of which the conveyor mechanism is a part. The shaft 13 may be the driving shaft and may be rotated in any suitable manner.

The upper run of the conveyor 11 preferably is disposed in a horizontal position and operates over a guide rail 18. The guide rail is carried on a support bar 19 which is bolted to the main frame 17.

A plurality of cradles 22 secured to the conveyor at spaced intervals support and carry the container bodies B along the upper run of the conveyor. The bodies may be received on the cradles from any suitable source of supply. Each cradle 22 carries one container body disposed in an upright or on end position. Retainer lugs 23 extending up from the cradle hold the body in place. There are four of these lugs disposed adjacent the four corners of the body and they extend up inside the body.

The upright bodies B as they move with the conveyor 11 in a continuous procession one behind the other in spaced and timed relation, pass between pairs of spaced and parallel guide bars 25 which extend for the full length of the upper run of the conveyor and which constitute side guides for retaining the bodies in position against lateral displacement. These guide bars are secured to arms 26 which extend up from the main frame 17.

The turning of the bodies end over end is effected partially by a tumbler block 31 (Fig. 1) while the bodies are traveling along the upper run of the conveyor. This tumbler block is provided as a part of the turnover device A. The block extends across the path of travel of the bodies on the conveyor and is supported adjacent its outer ends on brackets 32 which are bolted to the main frame 17. The top of the block is formed with a pair of sloping, tapered or inclined faces 33, 34 which meet in a peak or ridge 35 and which extends transversely of the conveyor mechanism.

The tumbler block 31 serves as a pivot or fulcrum element, as will be hereinafter more fully explained, for turning a body end over end while the cradle 22 on which the body was supported, passes under the block and comes into position on the opposite side of the block for receiving a turned-over body. To permit this passage of the cradles 22 under the block, the bottom of the block is provided with a clearance recess 36 for the body retaining lugs 23 on the cradles.

Turning of the bodies B over the tumbler block 31 is effected preferably by an endless chain turnover conveyor 41 having a plurality of turnover elements 42 mounted thereon at spaced intervals. The turnover conveyor 41 is disposed above the feeding conveyor 11 in spaced relation thereto adjacent the tumbler block 31 and operates over a driving sprocket 43 and an idler sprocket 44 respectively mounted on a drive shaft 45 and an idler shaft 46 journaled in bearings 47 formed in a sub-frame 48 supported on the main frame 17. The drive shaft is driven in any suitable manner in time with the feeding conveyor 11 and operates the turnover conveyor 41 at a lineal speed of travel slightly greater than that of the feeding conveyor.

The lower run of the turnover conveyor 41 extends down toward the feeding conveyor 11 along converging, angularly disposed lines which terminate adjacent a small idler sprocket 51 and an adjacently disposed sprocket 52 over which this lower run of the conveyor operates. Between these two spaced sprockets the lower run of the turnover conveyor extends substantially parallel with the feeding conveyor. The small idler sprocket 51 and the sprocket 52 are mounted respectively on an idler shaft 53 and a drive shaft 54 journaled in bearings 55, 56 formed in the sub-frame 48.

Each of the turnover elements 42 carried on the turnover conveyor 41 at spaced intervals is formed with a pair of longitudinally spaced fingers which constitute a long turning finger 58 and a short or auxiliary turning finger 59. These fingers move with the turnover conveyor 41 in timed relation to the cradles 22 on the feeding conveyor 11.

In operation, a turnover element 42 as it passes around the idler sprocket 44 moves along the downwardly inclined section of the lower run of the turnover conveyor 41 toward the small idler sprocket 51, in timed relation with an advancing body B carried on the feeding conveyor 11, the turnover element 42 moving at a slightly faster rate of speed than the body. During this travel of the turnover element, its long finger 58 enters the top end of the body and travels forward toward the leading front wall of the body as the turnover element moves along the short parallel section of the turnover conveyor as best shown in Figs. 1 and 3.

During this movement of the turnover element, the body is advancing toward the tumbler block 31. Just as the body comes adjacent this block, the long finger 58 inside the body and traveling at a faster rate of speed than the body, engages the front wall of the body on the inside and knocks the body over onto the adjacent inclined face 33 of the tumbler block 31 as best shown in Fig. 1. This rapid movement of the body removes it from and clear of its cradle 22 and thus permits the cradle to freely pass under the block.

Immediately upon its removal from the cradle 22, the knocked over body, now disposed in an inclined position on the face 33 of the tumbler block 31, is pushed upwardly toward the top of the block as shown in Fig. 5. This is effected by a wire hook 61 which is secured to an actuating bar 62 disposed in an angular position adjacent the path of travel of the bodies. The lower end of the bar is formed with an elongated slot 63. A screw 64 having a large head extends through the slot and is threadedly secured in the main frame 17 and thus retains the bar in a vertical plane while permitting movement of the bar in this plane. The upper end of the bar is pivotally mounted on a disc 66 carried on and rotating with the drive shaft 54 of the turnover device.

Thus the upper end of the bar is rotated through a circular path of travel while its lower end moves through a substantially straight line path of travel. These movements of the bar result in a curved path of travel for the hook 61 and a timing of the hook which passes the hook over the top of the advancing body and to one side of the long finger 58 engaged therewith, and which brings the hook downward in back of the body and thence upward in engagement with the bottom of the body, this latter incident taking place just as the body falls onto the tumbler block 31.

As the hook 61 continues its travel through the remainder of its cycle of operation, it pushes the body up onto the peak or ridge 35 of the tumbler block as shown in Fig. 5. As soon as the body reaches this position the short finger 59 of the next succeeding turnover element 42 engages the end of the body as shown in Fig. 3 and pushes the body over the peak and permits it to slide down the adjacent inclined face 34 of the tumbler block into the inclined position shown in Fig. 4. The sliding body is immediately caught by a stop element 68 and is thus restrained against moving down into engagement with the feeding conveyor 11 or against turning over on its side.

The stop element 68 is an angularly shaped member having a flat restraining wall section 69 and an integral ledge 70 formed at the bottom thereof and disposed at right angles thereto. This member is formed on the lower end of a curved arm 72 which extends up toward the upper run of the turnover conveyor 41. At its upper end the arm is adjustably secured to a substantially horizontal link 73. The inner end of the link is pivotally connected to a rocker arm 74 mounted on a pivot pin 75 carried in the turnover sub-frame 48. The outer end of the link is pivotally connected to the outer end of a crank 76 mounted on the outer end of the drive sprocket shaft 45.

Hence the crank 76 rotates in time with the travel of the turnover conveyor 41 and the turnover elements 42 carried thereon, and thus swings the curved arm 72 and the stop element 68 formed thereon through a curved path of travel in time with the turning of the bodies B. The timing of the movement of the stop element is such that as a body is pushed over the ridge 35 of the tumbler block 31, the stop element comes into place in the path of travel of the body in such a manner that the ledge 70 engages under the bottom end of the body (formerly its top end) and the side wall section 69 is disposed adjacent the upper side wall of the body.

Thus the body is nested in the stop element and its downward movement along the inclined face 34 of the tumbler block is controlled and restrained by the movement of the stop element. The ledge 70 of the stop element holds the body above the path of travel of the retaining lugs 23 on the feeding conveyor cradles 22 and thereby prevents engagement of the body by the cradles until the proper time.

During this movement of the body over the tumbler block 31 it has been turned end over end through an angle of approximately 135 degrees and the long finger 58 of the turnover element 42 which started the turning movement has passed from the body and is moving up along the upwardly inclined section of the lower run of the turnover conveyor 41. The remainder of the turning action to complete the 180 degree turnover of the body and to set the body in a reversed or inverted upright position on the feeding conveyor is effected by the short finger 59 which remains in engagement with the body as the latter is seated in the stop element 68.

In the angularly disposed position of the body in the stop element 68 its upper edge (formerly its lower edge) is still in the path of travel of the short finger 59 and the moving finger is still in engagement with the edge of the body as shown in Fig. 4. As the finger continues to move forward, it pivots or hinges the body upwardly as shown in Fig. 5 until it is in a fully inverted or upright position.

During this uprighting action by the short finger 59, the stop element 68 is traveling downward along the lower portion of its curved path of travel and thus moves away from the body and permits the body to fall into place over the retaining lugs 23 of a cradle 22 on the feeding conveyor 11. This cradle is not the same cradle that the body was removed from, before being turned through its 180 degree movement, but is an advanced cradle on the conveyor. However the proper replacing of the inverted and uprighted body onto a cradle returns it to the proper timed relation with the other bodies in the moving procession. Proper positioning of the body on the cradle is facilitated by a pair of webs 24 which extend rearwardly from the cradles 22 and which are formed with curved upper edges for guiding a body into place over the retaining lugs 23 as it is lowered onto its cradle.

After thus releasing the uprighted body for deposit onto the cradle 22 the stop element 68 in continuing its curved path of travel moves upwardly and passes over the top of the body as the latter advances with the feeding conveyor 11 to any suitable place of deposit or for subsequent operations. Simultaneously with this movement of the stop element 68, the short finger 59 passes up out of engagement with the body to permit free advancement of the body with the feeding conveyor. This completes the cycle of operation of the turnover device in turning a body end over end through an angle of 180 degrees while keeping it in timed relation with the other bodies in the procession for further advancement.

Such a turning of the bodies end over end by the turnover device of the instant invention takes place rapidly and gently and with a smooth action which in no way mars or damages the bodies. The construction of the device is particularly adapted to operating on bodies moving in a continuous procession. In such a procession a long finger 58 of the turnover elements 42 is starting a turning action on one body while the short finger 59 of the same turnover element is completing the turning action on the next forward or advanced body. Hence the turning action of the bodies in the procession is practically a continuous operation and is particularly advantageous for machines or conveyors operating at high speed rates of production.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a conveyor mechanism for articles such as container bodies and the like, the combination of a feeding conveyor for carrying a body in an upright position along a predetermined path of travel, tumbler means disposed in the path of travel of the body, turnover conveyor means movable adjacent the path of travel of said feeding conveyor and having elements for engaging against the moving body as it approaches said tumbler means for removing the body from said conveyor and turning it end over end over said tumbler means and for returning it to said conveyor in an inverted position, and movable stop means operable in time with said turnover conveyor means for engaging against said body during its turning movement on said tumbler means.

2. In a conveyor mechanism for articles such as container bodies and the like, the combination of a feeding conveyor for carrying a plurality of the bodies in an upright position in spaced relation and in a continuous procession along a predetermined path of travel, a stationary tumbler block having sloping faces disposed across the path of travel of the bodies, and turnover conveyor means movable adjacent the path of travel of said feeding conveyor and having elements for engaging against a moving body and for advancing the body over a sloping face of said tumbler block for removing the body from said conveyor and for turning it end over end over said tumbler block and for advancing the body over another sloping face of said tumbler block to return it to said conveyor in an inverted position.

3. In a conveyor mechanism for articles such as container bodies and the like, the combination of a feeding conveyor for carrying a plurality of the bodies in an upright position in spaced relation and in a continuous procession along a predetermined path of travel, tumbler means disposed in the path of travel of the bodies, a turnover conveyor disposed adjacent the path of travel of said feeding conveyor and operable in time with said feeding conveyor, and a plurality of fingers carried on said turnover conveyor and engageable against the bodies moving with said feeding conveyor for turning them end over end over said tumbler means and into an inverted position as the feeding conveyor passes said tumbler means.

4. In a conveyor mechanism for articles such as container bodies and the like, the combination of a feeding conveyor for carrying a plurality of the bodies in an upright position in spaced relation and in a continuous procession along a predetermined path of travel, tumbler means disposed in the path of travel of the bodies, an endless chain turnover conveyor disposed adjacent the path of travel of said feeding conveyor and operable continuously in time with said feeding conveyor, and a plurality of finger units carried on said turnover conveyor in spaced relation, each of said finger units having a long finger engageable into an end of a body as it approaches said tumbler means for turning the body into a partially turned position free of said feeding conveyor and onto said tumbler means, each of said finger units also having a short finger engageable into an end of the partially turned body on said tumbler means for completing the turning of the body over said tumbler means and for returning it to said feeding conveyor in an inverted position.

5. In a conveyor mechanism for articles such as container bodies and the like, the combination of a feeding conveyor for carrying a plurality of the bodies in an upright position in spaced relation and in a continuous procession along a predetermined path of travel, tumbler means disposed in the path of travel of the bodies, a turnover conveyor disposed adjacent the path of travel of said feeding conveyor and operable in time with said feeding conveyor, a plurality of fingers carried on said turnover conveyor and engageable against the bodies moving with said feeding conveyor for turning them end over end over said tumbler means and into an inverted position as the feeding conveyor passes said tumbler means, and movable stop means operable in time with said turnover conveyor and engageable with said body during its turning movement for restraining its turning beyond an inverted position.

6. In a conveyor mechanism for articles such as container bodies and the like, the combination of a feeding conveyor for carrying a plurality of the bodies in an upright position in spaced relation and in a continuous procession along a predetermined path of travel, tumbler means disposed in the path of travel of the bodies, a turnover conveyor disposed adjacent the path of travel of said feeding conveyor and operable in time with said feeding conveyor, a plurality of fingers carried on said turnover conveyor and engageable against the bodies moving with said feeding conveyor for turning them end over end over said tumbler means and into an inverted position as the feeding conveyor passes said tumbler means, and movable stop means operable by said turnover conveyor in synchronism therewith and engageable with said body during its turning movement for restraining its turning beyond an inverted position.

7. In a conveyor mechanism for articles such as container bodies and the like, the combination of a feeding conveyor for carrying a plurality of the bodies in an upright position in spaced relation and in a continuous procession along a predetermined path of travel, tumbler means disposed in the path of travel of the bodies, turnover conveyor means movable adjacent the path of travel of said feeding conveyor and having elements for engaging against a moving body as it approaches said tumbler means for removing the body from said conveyor and for turning it end over end over said tumbler means and for returning it to said conveyor in an inverted position, and projections carried on said feeding conveyor for locating the inverted body in a predetermined position thereon for maintaining the spacing and timed relation of the bodies on said conveyor.

8. In a conveyor mechanism for tubular articles such as container bodies and the like, the combination of a feeding conveyor for carrying a body in an upright position along a predetermined path of travel, a stationary tumbler block disposed in the path of travel of the body and having inclined faces terminating in a ridge above said feeding conveyor and extending across the path of travel of the body, and turnover conveyor means movable above the path of travel of said feeding conveyor and having elements for engaging against the moving body and for advancing the body over an inclined face of said tumbler block for removing the body from said conveyor and for passing it over the ridge of said tumbler block along another of said inclined faces and at the same time turning the body end over end and returning it to said conveyor in an inverted position.

9. In a conveyor mechanism for articles such as container bodies and the like, the combination of a feeding conveyor for carrying a body in an upright position along a predetermined path of travel, tumbler means disposed in the path of travel of the body, turnover conveyor means movable adjacent the path of travel of said feeding conveyor and having primary elements for engaging against the moving body as it approaches said tumbler means for removing the body from said conveyor and for depositing it in a partially turned position on said tumbler means, auxiliary turnover means engageable under the partially turned body for pushing it over said tumbler means for shifting it into a further partially turned position, and auxiliary elements carried by said turnover conveyor means and engageable with the partially turned body for completing the turning operation and for returning it to said conveyor in an inverted position.

10. In a conveyor mechanism for articles such as container bodies and the like, the combination of a feeding conveyor for carrying a body in an upright position along a predetermined path of travel, tumbler means disposed in the path of travel of the body, turnover conveyor means movable adjacent the path of travel of said feeding conveyor and carrying primary elements for engaging against the moving body as it approaches said tumbler means for removing the body from said conveyor and for depositing it in a partially turned position on said tumbler means, auxiliary turnover means engageable under the partially turned body for pushing it over said tumbler means for shifting it into a further partially turned position, auxiliary elements carried by said turnover conveyor means and engageable with the partially turned body for completing the turning operation, and stop means movable into the path of travel of the turning body and operable with said auxiliary elements for engaging the body during the turning operation preparatory to deposit of the inverted body onto said feeding conveyor.

11. In a conveyor mechanism for articles such as container bodies and the like, the combination of a feeding conveyor for carrying a body in an upright position along a predetermined path of travel, tumbler means disposed in the path of travel of the body, a turnover finger movable adjacent the path of travel of said feeding conveyor and engaging in an end of the moving body as it approaches said tumbler means for knocking the body over onto said tumbler means, a lifter finger traveling through a curved path of travel adjacent said feeding conveyor for lifting and turning the body into a predetermined position on said tumbler means, an auxiliary turnover finger movable adjacent the path of travel of said feeding conveyor for turning the partially turned body into an upright inverted position, and stop means movable adjacent said tumbler means through a curved path of travel for receiving the upright body and for returning it to said conveyor.

12. In a conveyor mechanism for tubular articles such as container bodies and the like, the combination of a feeding conveyor for carrying a plurality of the bodies in an upright position in spaced relation and in a continuous procession along a predetermined path of travel, tumbler means disposed in the path of travel of the bodies, an endless chain turnover conveyor disposed adjacent the path of travel of said feeding conveyor and operable continuously in time with said feeding conveyor, and a plurality of finger units carried on said turnover conveyor in spaced relation, each of said units having a long finger and a longitudinally spaced cooperating short finger for turning the bodies end over end through an angle of one hundred eighty degrees over said tumbler means and for returning the bodies to said feeding conveyor in an upright inverted position, said fingers being independently engageable with two separate adjacently disposed bodies in a moving procession for starting the turning movement on one of said bodies and for simultaneously completing the turning movement on the other of said bodies.

FRANK F. BORKMANN.

REFERENCES CITED

The following references are of record in the file of this patent:

UNITED STATES PATENTS

| Number | Name | Date |
| --- | --- | --- |
| 1,389,794 | Thiele et al. | Sept. 6, 1921 |
| 1,510,096 | Miller | Sept. 30, 1924 |
| 2,370,188 | Pellegrino | Feb. 27, 1945 |
| 2,387,674 | McIntire | Oct. 23, 1945 |